US012110034B2

(12) United States Patent
Itatsu (10) Patent No.: US 12,110,034 B2
(45) Date of Patent: Oct. 8, 2024

(54) MONITORING APPARATUS, MONITORING PROGRAM, AND MONITORING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Taro Itatsu, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 557 days.

(21) Appl. No.: 17/295,758

(22) PCT Filed: Nov. 27, 2019

(86) PCT No.: PCT/JP2019/046269
§ 371 (c)(1),
(2) Date: May 20, 2021

(87) PCT Pub. No.: WO2020/111090
PCT Pub. Date: Jun. 4, 2020

(65) Prior Publication Data
US 2022/0024471 A1 Jan. 27, 2022

(30) Foreign Application Priority Data
Nov. 28, 2018 (JP) ................................. 2018-222307

(51) Int. Cl.
*B60W 50/04* (2006.01)
*B60R 16/023* (2006.01)
(Continued)

(52) U.S. Cl.
CPC ....... *B60W 50/045* (2013.01); *B60R 16/0231* (2013.01); *G06F 8/65* (2013.01);
(Continued)

(58) Field of Classification Search
CPC ........................................................ G06F 8/65
See application file for complete search history.

(56) References Cited

U.S. PATENT DOCUMENTS 8,213,321 B2 * 7/2012 Butts .................. H04L 43/0847
370/242
9,946,531 B1 * 4/2018 Fields .................. G05D 1/0278
(Continued)

FOREIGN PATENT DOCUMENTS

JP 2018120503 A * 8/2018 ............. B60R 16/02

OTHER PUBLICATIONS

Google Machine Translation of JP2018120503A (2017).*
International Search Report, Application No. PCT/JP2019/046269, mailed Mar. 3, 2020. ISA/Japan Patent Office.

*Primary Examiner* — Jean Paul Cass
(74) *Attorney, Agent, or Firm* — Honigman LLP (57) ABSTRACT

A monitoring apparatus that is for installation in a vehicle, is to be communicably connected to a vehicle-mounted update apparatus that stores configuration information of a vehicle-mounted ECU that is to apply an update program, and monitors the vehicle-mounted update apparatus. The monitoring apparatus includes: a control unit that obtains the configuration information of the vehicle-mounted ECU from the vehicle-mounted update apparatus, and, if previously obtained first configuration information and most recently obtained second configuration information are different, the control unit determines that the vehicle-mounted update apparatus has been replaced and executes predetermined processing.

10 Claims, 7 Drawing Sheets

(51) Int. Cl.
  *B60W 50/00* (2006.01)
  *G06F 3/14* (2006.01)
  *G06F 8/65* (2018.01)
  *G07C 5/00* (2006.01)
  *G07C 5/08* (2006.01)

(52) U.S. Cl.
  CPC ............ *G07C 5/008* (2013.01); *G07C 5/0808* (2013.01); *B60W 2050/0083* (2013.01); *B60W 2050/046* (2013.01); *B60W 2556/45* (2020.02); *G06F 3/14* (2013.01)

(56) References Cited

U.S. PATENT DOCUMENTS

| | | |
|---|---|---|
| 10,437,680 B2 | 10/2019 | Kito et al. |
| 11,429,370 B2 * | 8/2022 | Inoue ................ B60W 50/045 |
| 2008/0186870 A1 * | 8/2008 | Butts ................ H04L 41/0659 |
| | | 370/252 |
| 2009/0009307 A1 * | 1/2009 | Takagi .................. B60R 16/03 |
| | | 340/438 |
| 2019/0034256 A1 * | 1/2019 | Fox .......................... G06F 9/445 |
| 2019/0265966 A1 * | 8/2019 | Shimomura .......... B60R 16/023 |
| 2019/0394277 A1 | 12/2019 | Go et al. |
| 2020/0272451 A1 * | 8/2020 | Inoue ................ B60W 50/045 |
| 2021/0344718 A1 * | 11/2021 | Raleigh ................. G06Q 40/12 |

* cited by examiner

Vehicle configuration information master table

| ECU-ID | Manufacturing number (serial number) | ECU-part number (model number) | Software-part number | Current version | Old version | Number of work banks | Work bank |
|---|---|---|---|---|---|---|---|
| 001 | SN-ABC-0120 | AAAA | swaaa | 3.51 | 3.44 | 1 | A |
| 002 | SN-XCC-9999 | BBBB | swbbb | 4.2d | 4.2c | 2 | B |
| 003 | ..... | ..... | | | | | |
| 004 | ..... | ..... | | | | | |

| MAC address | IP address | Date and time of previous completed update | C | VIN (Vehicle identification number) |
|---|---|---|---|---|
| f2-23-xx-15-fc-xx | 192.168.10.5 | 2018/3/20/18:15 | Complete | 1234556789A1234567 |
| ab-xx-55-23-ac-xx | 192.168.10.6 | 2018/1/23/07:45 | Complete | null |
| | | | | |

Legend
A= Single bank
B= Dual bank
C=Reprogramming status

MONITORING APPARATUS, MONITORING PROGRAM, AND MONITORING METHOD

CROSS-REFERENCE TO RELATED APPLICATIONS

This application is the U.S. national stage of PCT/JP2019/046269 filed on Nov. 27, 2019, which claims priority of Japanese Patent Application No. JP 2018-222307 filed on Nov. 28, 2018, the contents of which are incorporated herein.

TECHNICAL FIELD

The present invention relates to a monitoring apparatus, a monitoring program, and a monitoring method.

BACKGROUND

Vehicle-mounted ECUs (Electronic Control Units), which are for controlling vehicle-mounted devices in systems such as power-train systems for engine control or the like and body systems for air conditioning control or the like, are installed in a vehicle. The vehicle-mounted ECUs each include an arithmetic processing unit such as an MPU, a re-writable non-volatile storage unit such as a RAM, and a communication unit for communicating with another vehicle-mounted ECU, and control a vehicle-mounted device by reading and executing a control program stored in the storage unit thereof. Furthermore, a relay apparatus provided with a wireless communication function is mounted to the vehicle, and a control program for a vehicle-mounted ECU can be updated by communicating, via the relay apparatus, with a program providing apparatus connected to an external network and downloading (receiving) the control program of the vehicle-mounted ECU from the program providing apparatus (for example, see JP 2017-97851A).

The relay apparatus disclosed in JP 2017-97851A stores apparatus identifiers and the like for identifying each vehicle-mounted ECU as management data regarding the vehicle-mounted ECUs in a storage unit, and refers to the management data to generate an obtainment request for obtaining a control program for a vehicle-mounted ECU that is to be updated.

The relay apparatus disclosed in JP 2017-97851A has a problem in that no consideration is given to actions to be taken in the case where the relay apparatus (vehicle-mounted update apparatus) that consolidates and stores the apparatus identifiers of the vehicle-mounted ECUs is replaced.

An object of the present disclosure is to provide a monitoring apparatus that can detect replacement if a vehicle-mounted update apparatus has been replaced.

SUMMARY

A monitoring apparatus according to one aspect of the present disclosure is a monitoring apparatus that is for installation in a vehicle, is to be communicably connected to a vehicle-mounted update apparatus that stores configuration information of a vehicle-mounted ECU that is to apply an update program, and monitors the vehicle-mounted update apparatus, the monitoring apparatus including: a control unit configured to obtain the configuration information of the vehicle-mounted ECU from the vehicle-mounted update apparatus, wherein, if previously obtained first configuration information and most recently obtained second configuration information are different, the control unit determines that the vehicle-mounted update apparatus has been replaced and executes predetermined processing.

Advantageous Effects of the Present Disclosure

According to an aspect of the present disclosure, a monitoring apparatus that can detect replacement if a vehicle-mounted update apparatus has been replaced can be provided.

BRIEF DESCRIPTION OF DRAWINGS

FIG. 2 is a block diagram illustrating an example of a configuration of the monitoring apparatus and the like.

FIG. 7 is a block diagram illustrating an example of a configuration of the monitoring apparatus and the like.

DETAILED DESCRIPTION OF PREFERRED EMBODIMENTS

First, embodiments of the present disclosure will be listed and illustrated. At least some of the embodiments to be described below may be combined as appropriate.

A monitoring apparatus according to one aspect of the present disclosure is a monitoring apparatus that is for installation in a vehicle, is to be communicably connected to a vehicle-mounted update apparatus that stores configuration information of a vehicle-mounted ECU that is to apply an update program, and monitors the vehicle-mounted update apparatus, the monitoring apparatus including: a control unit configured to obtain the configuration information of the vehicle-mounted ECU from the vehicle-mounted update apparatus, wherein, if previously obtained first configuration information and most recently obtained second configuration information are different, the control unit determines that the vehicle-mounted update apparatus has been replaced and executes predetermined processing.

In this aspect, if the first configuration information previously obtained from the vehicle-mounted update unit and the most recently obtained second configuration information are different, the control unit determines that the vehicle-mounted update apparatus has been replaced and executes predetermined processing, and thus appropriate actions can be taken regarding the replaced vehicle-mounted update apparatus.

The monitoring apparatus according to one aspect of the present disclosure, wherein, if an ignition switch of the vehicle is turned on, the control unit obtains the second configuration information, and determines that the vehicle-mounted update apparatus has been replaced and executes predetermined processing if the first configuration information obtained prior to the turning-on and the second configuration information are different.

In this aspect, the control unit obtains the first configuration information before the vehicle ignition switch (IG switch) is turned on, that is, during the period of time from when the switch is turned off to when it is turned on, or before it is turned off. Then, the control unit obtains the second configuration information after the switch has been turned on, and thus, if the vehicle-mounted update apparatus is replaced in the period of time between when the ignition switch is turned off and then on, that is to say while the vehicle is stopped, the control unit can appropriately determine that the vehicle-mounted update apparatus has been replaced.

The monitoring apparatus according to one aspect of the present disclosure, wherein the control unit obtains the first configuration information and the second configuration information in a period of time not including a point in time when the configuration information of the vehicle-mounted ECU obtained by the vehicle-mounted update apparatus is stored.

In this aspect, the control unit obtains the first configuration information and the second configuration information in a period of time not including the point in time at which the configuration information of the vehicle-mounted ECU obtained by the vehicle-mounted update apparatus is stored. That is, the configuration information of the vehicle-mounted ECUs is obtained by the vehicle-mounted update apparatus in the period excluding the period of time from when the monitoring apparatus obtains the first configuration information until when the monitoring apparatus obtains the second configuration information, and thus the accuracy of the result of comparison of the first configuration information and the second configuration information can be guaranteed.

The monitoring apparatus according to one aspect of the present disclosure, wherein the control unit obtains the first configuration information and the second configuration information in a period of time not including a point in time when the configuration information of the vehicle-mounted ECU obtained by the vehicle-mounted update apparatus is stored.

In this aspect, as a result of the control unit transmitting the information regarding the determination to the external server or the display apparatus provided in the vehicle, the administrator of the external server or the operator of the vehicle can be made aware of the fact that the vehicle-mounted update apparatus has been replaced.

The monitoring apparatus according to one aspect of the present disclosure, wherein an external communication apparatus for communicating with the external server that provides the update program and the monitoring apparatus are directly connected, and the predetermined processing executed by the control unit is processing for transmitting the information regarding the determination to the external server that provides the update program via the external communication apparatus, not via the vehicle-mounted update apparatus.

In this aspect, the monitoring apparatus and the external communication apparatus for communicating with the external server that provides an update program are directly connected to each other by a harness such as a serial cable, via their input-output I/Fs. Accordingly, the monitoring apparatus can communicate with the external server via the external communication apparatus, without doing so via the vehicle-mounted update apparatus (gateway). In the case of determining that the vehicle-mounted update apparatus has been replaced and executing predetermined processing, there is a high probability that the replaced vehicle-mounted update apparatus is an unauthorized apparatus, and thus the monitoring apparatus, which is directly connected to the external communication apparatus, can communicate with the external server via the external communication apparatus, without doing so via the suspected unauthorized vehicle-mounted apparatus. Accordingly, an indication that the vehicle-mounted update apparatus has been replaced can be reliably transmitted to the external server.

The monitoring apparatus according to one aspect of the present disclosure, wherein the predetermined processing executed by the control unit is processing for transmitting a signal that prohibits a program stored in the vehicle-mounted ECU from being updated by the update program, to the vehicle-mounted ECU.

In this aspect, as a result of the control unit transmitting a signal prohibiting program updates to the vehicle-mounted ECUs, the vehicle-mounted ECUs can be prevented from updating their programs using an update program transmitted by a replaced vehicle-mounted update apparatus.

The monitoring apparatus according to one aspect of the present disclosure, wherein the vehicle-mounted update apparatus and the monitoring apparatus are directly connected by an Ethernet cable.

In this aspect, by directly connecting the vehicle-mounted update apparatus and the monitoring apparatus using an Ethernet cable, the number of hops can be reduced, and the communication efficiency between the vehicle-mounted update apparatus and the monitoring apparatus can be improved.

A monitoring program according to one aspect of the present disclosure is for causing a computer to execute processing for: obtaining, from a vehicle-mounted update apparatus that stores configuration information of a vehicle-mounted ECU that is to apply an update program, the configuration information of the vehicle-mounted ECU; and determining that the vehicle-mounted update apparatus has been replaced and executing predetermined processing if previously obtained first configuration information and most recently obtained second configuration information are different.

In this aspect, a monitoring program that can detect replacement if the vehicle-mounted update apparatus has been replaced can be provided.

A monitoring method according to one aspect of the present disclosure is for obtaining, from a vehicle-mounted update apparatus that stores configuration information of a vehicle-mounted ECU that is to apply an update program, the configuration information of the vehicle-mounted ECU; and determining that the vehicle-mounted update apparatus has been replaced and executing predetermined processing if previously obtained first configuration information and most recently obtained second configuration information are different.

In this aspect, a monitoring method that can detect replacement if the vehicle-mounted update apparatus has been replaced can be provided.

The following specifically describes the present disclosure based on the drawings illustrating embodiments thereof. A monitoring apparatus 5 according to embodiments of the present disclosure will be described below with reference to the drawings. Note that the present disclosure is not limited to these examples, but is indicated by the claims, and all changes that come within the meaning and range of equivalency of the claims are intended to be embraced therein.

Embodiment 1

Figure 1:
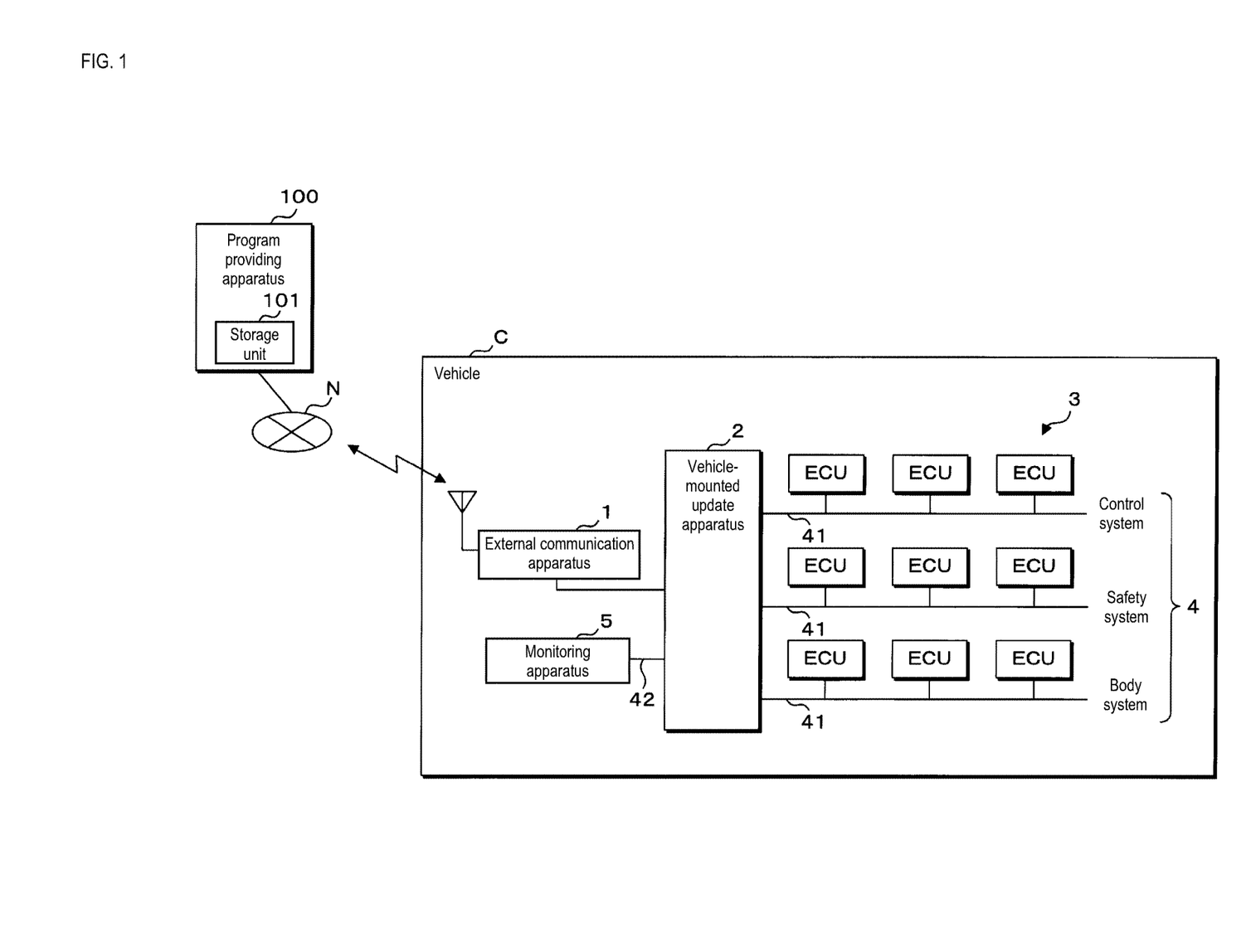
FIG. 1 is a schematic diagram illustrating an example of a configuration of a vehicle-mounted update system including a monitoring apparatus according to Embodiment 1.
Figure 2:
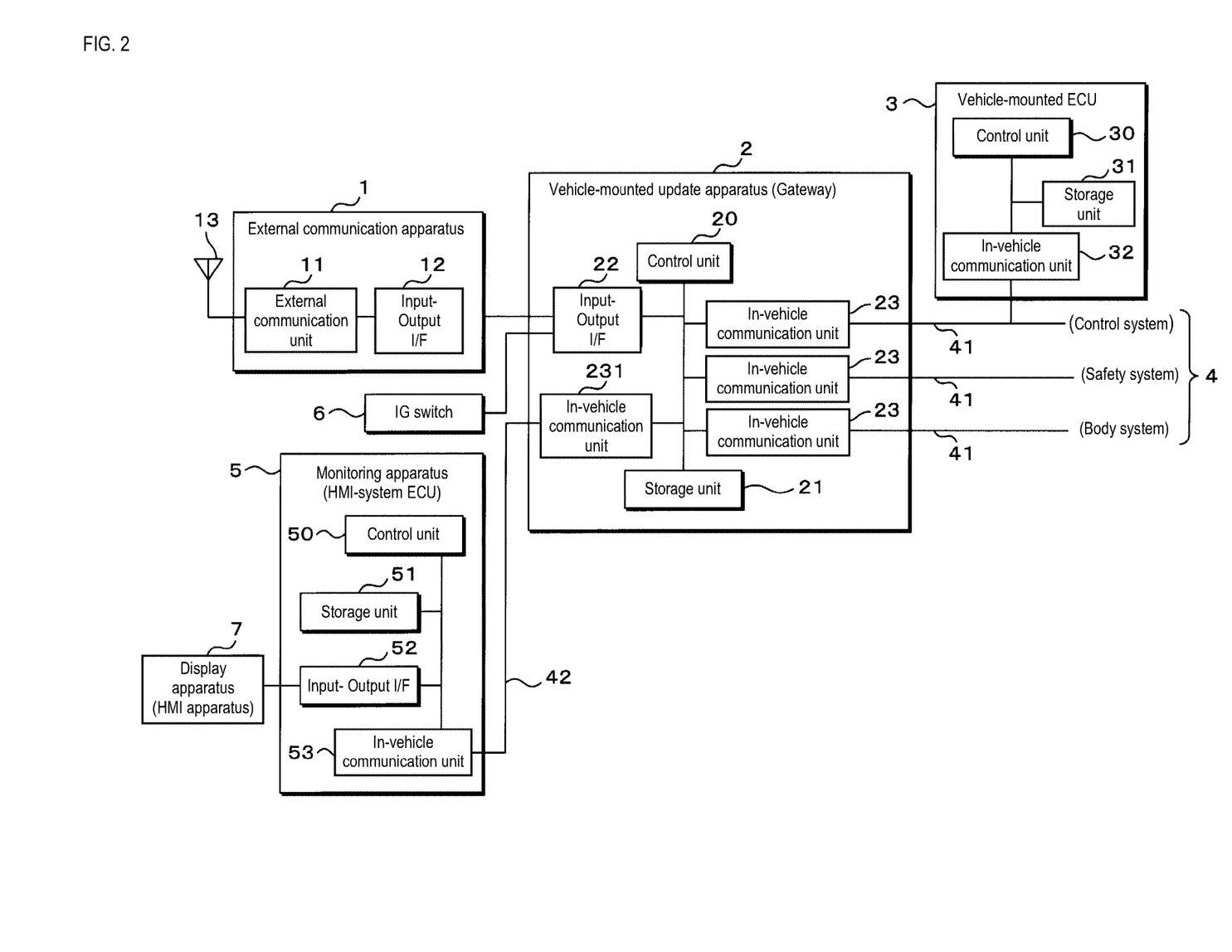

An embodiment is described below based on the drawings. FIG. 1 is a schematic diagram illustrating an example of a configuration of a vehicle-mounted update system including a monitoring apparatus 5 according to Embodiment 1. FIG. 2 is a block diagram illustrating an example of a configuration of the monitoring apparatus 5 and the like. A vehicle-mounted update system includes an external communication apparatus 1 and a vehicle-mounted update apparatus 2, which are installed in a vehicle C, and transmits a program or data obtained from a program providing apparatus 100 connected thereto via an external network N to a vehicle-mounted ECU (Electronic Control Unit) 3 installed in the vehicle C.

The program providing apparatus 100 is, for example, a computer such as a server or the like connected to the external network N such as the Internet or a public network, is provided with a storage unit 101 realized by a RAM (Random Access Memory), a ROM (Read Only Memory), a hard disk, or the like, and corresponds to an external server. A program or data for controlling a vehicle-mounted ECU 3 is stored in the storage unit 101 of the program providing apparatus 100, the program or data having been created by the manufacturer or the like of the vehicle-mounted ECU 3. As described below, the program or data is transmitted to the vehicle C as an update program, and is used to update a program or data of the vehicle-mounted ECU 3 installed in the vehicle C. The program providing apparatus 100 (external server) configured in this manner is also called an OTA (Over The Air) server. As a result of the vehicle-mounted ECU 3 installed in the vehicle obtaining the update program transmitted wirelessly from the program providing apparatus 100, and applying the update program as a program to be executed, the program executed by the receiving ECU can be updated (re-programmed).

Below, the program will be described as including an external file that contains program code that includes control syntax and the like for the vehicle-mounted ECU 3 to perform processing, and data that is referred to when the program code is to be executed. When an update program is transmitted, an external file in which the above-mentioned program code and data is described is transmitted from the program providing apparatus 100 as, for example, an encrypted archive file.

The vehicle-mounted update apparatus 2 functions as a reprogramming master that obtains configuration information from each of the vehicle-mounted ECUs 3 periodically or each time the vehicle-mounted ECUs 3 update a program (reprogram), and consolidates, stores, and manages the obtained configuration information. The monitoring apparatus 5 is communicably connected to the vehicle-mounted update apparatus 2 and exhibits a monitoring function of determining whether or not the vehicle-mounted update apparatus 2 has been replaced by obtaining configuration information stored in the vehicle-mounted update apparatus 2 at two different points in time and comparing the configuration information obtained at the two different points in time.

The external communication apparatus 1, the vehicle-mounted update apparatus 2, a display apparatus 7, a plurality of vehicle-mounted ECUs 3 for controlling various vehicle-mounted devices, and the monitoring apparatus 5 that determines whether or not the vehicle-mounted update apparatus 2 has been replaced without authorization, are installed in the vehicle C. The external communication apparatus 1 and the vehicle-mounted update apparatus 2 are communicably connected to each other by a harness such as a serial cable. The vehicle-mounted update apparatus 2 and the vehicle-mounted ECUs 3 are communicably connected to each other via communication lines 41 and an in-vehicle LAN 4 that support a communication protocol such as CAN (Control Area Network; registered trademark) or Ethernet (registered trademark).

The external communication apparatus 1 includes an external communication unit 11 and an input-output I/F (interface) 12 for communicating with the vehicle-mounted update apparatus 2. The external communication unit 11 is a communication apparatus for performing wireless communication using a mobile radio communication protocol such as 3G, LTE, 4G, or WiFi, and transmits/receives data to/from the program providing apparatus 100 via an antenna 13 connected to the external communication unit 11. Communication between the external communication apparatus 1 and the program providing apparatus is performed via an external network such as a public network or the Internet.

The input-output I/F 12 is a communication interface for performing, for example, serial communication with the vehicle-mounted update apparatus 2. The external communication apparatus 1 and the vehicle-mounted update apparatus 2 communicate with each other via the input-output I/F 12 and a harness such as a serial cable connected to the input-output I/F 12. In the present embodiment, the external communication apparatus 1 is a separate apparatus to the vehicle-mounted update apparatus 2, and these apparatuses are communicably connected to each other by the input-output I/F 12 and the like, but the present invention is not limited to this. The external communication apparatus 1 may be built into the vehicle-mounted update apparatus 2 as a constituent part of the vehicle-mounted update apparatus 2.

The vehicle-mounted update apparatus 2 includes a control unit 20, a storage unit 21, an input-output I/F 22, in-vehicle communication units 23, and an in-vehicle communication unit 231. The vehicle-mounted update apparatus 2 is configured to obtain, from the external communication apparatus 1, an update program received by the external communication apparatus 1 from the program providing apparatus 100 through wireless communication, and transmit the update program to a predetermined vehicle-mounted ECU 3 (vehicle-mounted ECU 3 to be updated) via the in-vehicle LAN 4. The vehicle-mounted update apparatus 2 is a gateway (repeater) that integrates segments of a system realized by the plurality of communication lines 41 of a control-system vehicle-mounted ECU 3, a safety-system vehicle-mounted ECU 3, a body-system vehicle-mounted ECU 3, and the like, and relays communication between the vehicle-mounted ECUs 3 in these segments. Also, the vehicle-mounted update apparatus 2 may be configured as a functional unit of a body ECU that performs overall control of the vehicle C.

The control unit 20 is constituted by a CPU (Central Processing Unit), an MPU (Micro Processing Unit), or the like and is configured to perform various types of control processing and arithmetic processing by reading out and executing a control program and data stored in advance in the storage unit 21. The control unit 20 corresponds to an obtaining unit that obtains, via the external communication apparatus 1, update programs transmitted from the program providing apparatus 100.

The storage unit 21 is constituted by a volatile memory element such as a RAM (Random Access Memory), or a non-volatile memory element such as a ROM (Read Only Memory), an EEPROM (Electrically Erasable Programmable ROM), or a flash memory, and control programs and data that is referred to during processing are stored therein in advance. A control program stored in the storage unit 21 may be a stored control program read from a readable recording medium by the vehicle-mounted update apparatus 2. Also, a control program may be downloaded from an un-shown external computer connected to an un-shown communication network and stored in the storage unit 21. Furthermore, the storage unit 21 stores configuration information regarding all vehicle-mounted ECUs 3 installed in the vehicle C. An update program obtained from the program providing apparatus 100 and information regarding the state of progress when an update program is being transmitted to a vehicle-mounted ECU 3 are stored in the storage unit 21.

Similarly to the input-output I/F 12 of the vehicle-mounted communication apparatus 1, the input-output I/F 22 is a communication interface for performing serial communication. The vehicle-mounted update apparatus 2 is communicably connected to the external communication apparatus 1 and an IG switch 6 via the input-output I/F 22.

The in-vehicle communication units 23 are input-output interfaces that use a communication protocol such as CAN (Control Area Network) or Ethernet (registered trademark), and the control unit 20 communicates with the vehicle-mounted ECUs 3 connected to the in-vehicle LAN 4 or another vehicle-mounted device such as a relay apparatus, via the in-vehicle communication units 23. A plurality of in-vehicle communication units 23 are provided (three in the drawings), and the communication lines 41 forming the in-vehicle LAN 4 are respectively connected to the in-vehicle communication units 23. By providing a plurality of in-vehicle communication units 23 in this manner, the in-vehicle LAN 4 is divided into a plurality of segments, and a vehicle-mounted ECU is connected to each segment according to the function (control-system function, safety-system function, and body-system function) of the vehicle-mounted ECU. The in-vehicle communication unit 231 is an input-output interface that uses a communication protocol such as Ethernet, and the control unit 20 communicates with the monitoring apparatus 5 via the in-vehicle communication unit 231.

Each vehicle-mounted ECU 3 includes a control unit 30, a storage unit 31, and an in-vehicle communication unit 32. The storage unit 31 is constituted by a volatile memory element such as a RAM (Random Access Memory), or a non-volatile memory element such as a ROM (Read Only Memory), an EEPROM (Electrically Erasable Programmable ROM), or a flash memory, and stores a program or data of the vehicle-mounted ECU 3. The program or data is to be updated by an update program transmitted from the vehicle-mounted update apparatus 2. Also, the storage unit 31 stores the configuration information of the corresponding ECU.

The storage unit 31 includes a first storage area (first bank) and a second storage area (second bank). The storage unit 31 stores two programs, namely, the program currently being executed (applied) by the vehicle-mounted ECU 3 (current version) and the program applied previous to the current version (old version). The current version program and the old version program are stored separately in either the first storage area or the second storage area. That is, if the current version program is stored in the first storage area, the old version program is stored in the second storage area. If the old version program is stored in the first storage area, the current version program is stored in the second storage area. In this way, by storing the current version program and the old version program in a so-called dual bank, even if there is a problem with the current version program, the reliability of the vehicle-mounted ECU 3 can be guaranteed by the control unit 30 reading and executing (switching to) the old version program that ran properly when it was previously applied. The storage unit 31 is not limited to being of a dual bank, and may store a program using a single bank configuration that only has a first storage area.

The storage unit 31 stores information regarding the versions of both the current version program and the old version program and information regarding the area (work bank) where the currently executed (applied) program is stored. That is, if the program stored in the first storage area (first bank) is currently being executed, the storage unit 31 stores an indication that the work bank is the first storage area (first bank). If the program stored in the second storage area (second bank) is currently being executed, the storage unit 31 stores an indication that the work bank is the second storage area (second bank). The storage unit 31 stores configuration information regarding the corresponding ECU, including version information regarding the programs (current version and old version) and information regarding the work bank, information regarding the state of progress when receiving an update program from the vehicle-mounted update apparatus 2, and information regarding an update history of one or more past updates.

The control unit 30 is constituted by a CPU (Central Processing Unit), an MPU (Micro Processing Unit), or the like, and performs control processing etc., by reading out and executing a program and data stored in the storage unit 31 (work bank) to control a vehicle-mounted device including the vehicle-mounted ECU 3, an actuator, or the like.

The control unit 30 of the vehicle-mounted ECU 3 obtains an update program by receiving, via the in-vehicle communication unit 32, the update program transmitted from the vehicle-mounted update apparatus 2. Accordingly, the control unit 30 of the vehicle-mounted ECU 3 obtains the update program transmitted from the program providing apparatus 100 via the external communication apparatus 1 and the vehicle-mounted update apparatus 2. The control unit 30 stores the obtained update program in the storage area (first storage area or second storage area) that is not the work bank. That is, in obtaining the update program transmitted from the vehicle-mounted update apparatus 2, the control unit 30 deletes the program stored in the storage area that is not the work bank (non-work bank) as processing in preparation for obtaining the update program. Normally, the program stored in the storage area that is not the work bank is the old version program executed prior to the current version program, and thus the old version can be deleted without stopping control functions performed by the vehicle-mounted ECU 3 on a vehicle-mounted apparatus. The control unit 30 deletes the old version program stored in the storage area that is not the work bank (non-work bank) and stores the update program transmitted from the vehicle-mounted update apparatus 2 in the non-work bank.

Similarly to the vehicle-mounted ECU 3, the monitoring apparatus 5 includes a control unit 50, a storage unit 51, an in-vehicle communication unit 53, and an input-output I/F 52.

Similarly to the vehicle-mounted update apparatus 2 or the vehicle-mounted ECU 3, the control unit 50 is constituted by a CPU or an MPU, and is configured to perform various types of control processing and arithmetic processing by reading out and executing a control program and data stored in advance in the storage unit 51. The control unit 50 corresponds to an obtaining unit that executes the control program to obtain information, data, signals, and the like transmitted from the vehicle-mounted update apparatus 2 or a vehicle-mounted ECU 3. The control unit 50 corresponds to a determining unit that executes the control program to determine whether or not the vehicle-mounted update apparatus 2 has been updated.

Similarly to the vehicle-mounted update apparatus 2 or the vehicle-mounted ECU 3, the storage unit 51 is constituted by a volatile memory element such as a RAM (Random Access Memory), or a non-volatile memory element such as a ROM (Read Only Memory), an EEPROM (Electrically Erasable Programmable ROM), or a flash memory, and stores a program or data of the monitoring apparatus 5. Similarly to the vehicle-mounted update apparatus 2, the storage unit 51 stores configuration information (vehicle C configuration information) regarding all vehicle-mounted ECUs 3 installed in the vehicle C.

The in-vehicle communication unit 53 is an input-output interface that uses a similar communication protocol to that used by the in-vehicle communication unit 231 of the vehicle-mounted update apparatus 2, for example Ethernet. The monitoring apparatus 5 and the vehicle-mounted update apparatus 2 are directly connected to each other by the in-vehicle communication units 53 and 231 and a communication line 42 (Ethernet cable). By directly connecting the in-vehicle update apparatus 2 and the monitoring apparatus 5 to each other using an Ethernet cable, the hop count can be reduced, and communication efficiency between the in-vehicle update apparatus 2 and the monitoring apparatus 5 can be improved. Also, the monitoring apparatus 5 may be communicably connected to the in-vehicle update apparatus 2 by a communication line 41 realized by a CAN bus or the like such as the case with another vehicle-mounted ECU 3.

The monitoring apparatus 5 includes the input-output I/F 52 similar to that of the in-vehicle update apparatus 2, and the display apparatus 7 is connected to the input-output I/F 52. The storage unit 51 stores a display control program for controlling display by the display apparatus 7, and the monitoring apparatus 5 is configured as a HMI—(Human Machine Interface) system ECU as a result of the control unit 50 executing the display control program. The HMI-system ECU is included in the vehicle-mounted ECUs 3 installed in the vehicle C. As a result of the monitoring apparatus 5 being included in the HMI-system ECU and implementing a function of monitoring the vehicle-mounted update apparatus 2 as a function of the HMI-system ECU, the number of parts installed in the vehicle C can be reduced. Because the priority of the HMI-system ECU regarding travel safety of the vehicle C is lower than, for example, another vehicle-mounted ECU 3 of a control-system ECU, the function of monitoring the vehicle-mounted update apparatus 2 can be exhibited without affecting the travel safety of the vehicle C.

The display apparatus 7 is an HMI (Human Machine Interface) apparatus such as a car navigation display, for example. The display apparatus 7 is communicably connected to the input-output I/F of the monitoring apparatus 5, which is the HMI-system ECU, by a harness such as a serial cable. The display apparatus 7 displays data or information output from the control unit 50 of the monitoring apparatus 5, which is the HMI-system ECU, via the input-output I/F.

While the monitoring apparatus 5 is described as being a HMI-system ECU, the present invention is not limited to this. The monitoring apparatus 5 may be configured as a dedicated ECU (monitoring ECU). Also, the monitoring apparatus 5 may be included in a body-system ECU that performs overall control of the vehicle C. In the case where the monitoring apparatus 5 is configured as a dedicated ECU (monitoring ECU), the monitoring apparatus 5 does not function as an HMI-system ECU and is not connected to the in-vehicle LAN 4. The monitoring apparatus 5 is communicably connected to an HMI-system ECU via the vehicle-mounted update apparatus 2 and the in-vehicle LAN 4, and by transmitting data to the HMI-system ECU, information based on the transmitted data can be displayed on the display apparatus 7 connected to the HMI-system ECU.

The input-output I/F 22 of the vehicle-mounted update apparatus 2 is communicably connected to the IG switch (ignition switch) 6, which starts up or stops the vehicle C, by a wire harness such as a serial cable. When the IG switch 6 is turned on or off, a signal output (transmitted) from the IG switch 6 is obtained (received) by the control unit 20 of the vehicle-mounted update apparatus 2 via the input-output I/F 22. Based on the obtained signal, the control unit 20 of the vehicle-mounted update apparatus 2 transmits information regarding whether the IG switch 6 is on or off (IG ON signal or IG OFF signal) to all of the vehicle-mounted ECUs 3 and the monitoring apparatus 5 via the in-vehicle communication units 23 and 231. The vehicle-mounted ECUs 3 and the monitoring apparatus 5 obtain the information transmitted from the vehicle-mounted update apparatus 2 regarding whether the IG switch 6 was turned off or on (IG ON signal or IG OFF signal), and perform predetermined operations based on the thus obtained information.

Figure 3:
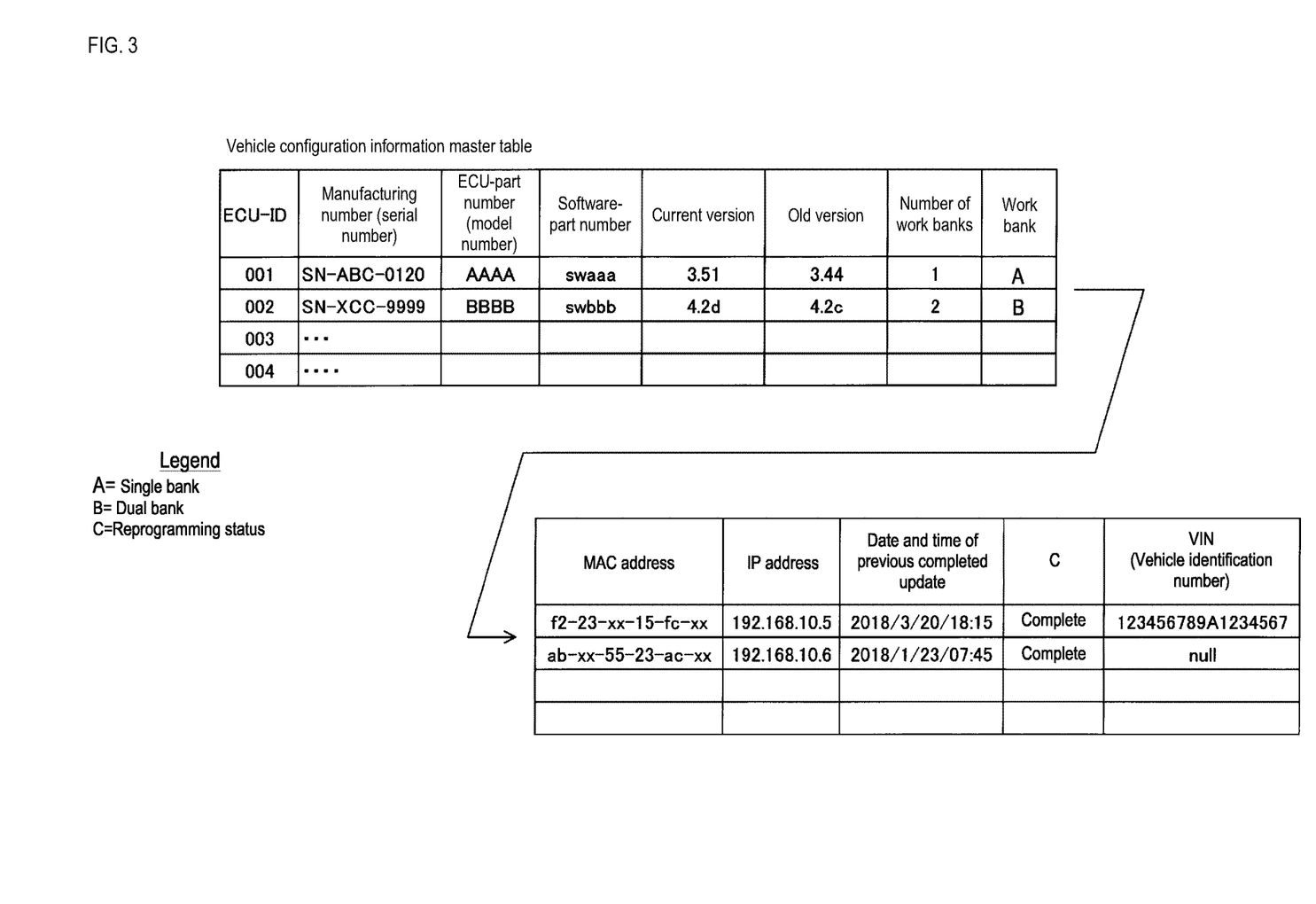
FIG. 3 is a descriptive diagram illustrating an example of a mode of configuration information regarding a vehicle-mounted ECU.

FIG. 3 is a descriptive diagram illustrating an example of a mode of configuration information regarding a vehicle-mounted ECU. When, for example, the IG switch 6 is turned on or turned off, or at a predetermined timing, the control unit 20 of the vehicle-mounted update apparatus 2 makes a request, to all of the vehicle-mounted ECUs 3 or a specific vehicle-mounted ECU 3 stationarily installed in the vehicle C, to transmit the configuration information of the corresponding ECU(s) and update history of the configuration information. Then, the vehicle-mounted update apparatus 2 obtains the configuration information and update history transmitted from the vehicle-mounted ECU(s) 3 and consolidates the configuration information and the like, and stores the consolidated configuration information (vehicle configuration information) and an update history (vehicle configuration information update history) in the storage unit 21. Also, the control unit 20 of the vehicle-mounted update apparatus 2 may obtain and consolidate configuration information and update information voluntarily transmitted from each of the vehicle-mounted ECUs 3 and store the information in the storage unit 21 without making a request to the vehicle-mounted ECUs 3 to transmit the configuration information and update information. Also, the control unit 20 of the vehicle-mounted update apparatus 2 may transmit an update program to the vehicle-mounted ECUs 3, and change the configuration information (vehicle configuration information) based on the transmitted update program every time transmission is completed.

The storage unit 31 in each vehicle-mounted ECU 3 stores configuration information and update history of the corresponding ECU. Accordingly, the vehicle-mounted update apparatus 2 consolidates the configuration information and update history stored in each of the vehicle-mounted ECUs 3, and stores the configuration information and update history of each of the vehicle-mounted ECUs 3. The vehicle-mounted update apparatus 2 may transmit the store consolidated configuration information and update history of each of the vehicle-mounted ECUs 3 to the program providing apparatus 100. By transmitting the configuration information and the update history to the program providing apparatus 100, the configuration information and update history can be backed up in the storage unit 101 of the program providing apparatus 100. The vehicle-mounted update apparatus 2 transmits the configuration information to the monitoring apparatus 5 periodically or in response to a request from the monitoring apparatus 5.

As shown in FIG. 3, the configuration information of each vehicle-mounted ECU 3 includes, for example, the manufacturing number (serial number) of the vehicle-mounted ECU 3, the ECU-part number (model number), the software part number, the current version program, the old version program, the number of work banks, the MAC (Media Access Control) address, the IP address, the date and time of the previous completed update, the reprogramming status, and the VIN (Vehicle Identification Number), and the configuration information is managed by associating it with an ECU-ID realized by a serial number set such that there are no duplicates between individual vehicle-mounted ECUs 3.

The manufacturing number (serial number) is a number given when the vehicle-mounted ECU 3 is manufactured, and is a unique number that consists of a lot number indicating the production base or the like and a serial number or the like given at the time of manufacturing, and can be used to uniquely specify the corresponding ECU. The ECU-part number (model number) is a number for specifying the type of the vehicle-mounted ECU and is a component number, for example. The software part number is a number for specifying the type of update program software.

The number of work banks is the number of storage areas in which update programs of different versions are stored. That is, if the number of work banks is two, two update programs of different versions can be stored. If the number of work banks is one, only one update program version can be stored. The work bank is information for specifying which of the storage areas (the first storage area or the second storage area) is the storage area that is storing the program currently being executed (applied) by the vehicle-mounted ECU 3.

The current version is the version number of the program currently being executed (applied) by the vehicle-mounted ECU 3, and is the version number of the program stored in the work bank. The old version is the version number of the program previously executed (applied) by the vehicle-mounted ECU 3, and is the version number of the program stored in the non-work bank (the storage area that is not the work bank).

The MAC address is an address corresponding to a data link layer in the case where the in-vehicle communications 23 of the vehicle-mounted ECU 3 are communication ports that support Ethernet. The MAC address is a number given when the in-vehicle communication units 23 are manufactured and is a unique number that is composed of a vendor code that indicates the manufacturer, a serial number given at the time of manufacturing, and the like, and can be used to uniquely specify an ECU. The IP address is an address corresponding to a network layer when communication is made using TCP/IP, in the case where the in-vehicle communication units 23 are communication ports that support Ethernet.

The VIN (Vehicle Identification Number) is a unique code including a serial number used to identify individual vehicles C, and is composed of 17 letters and numbers defined according to ISO3833. The VIN is not stored in the storage units 31 of all of the vehicle-mounted ECUs 3 installed in the vehicle, but is stored in the storage unit 31 of a specific vehicle-mounted ECU 3.

The configuration information of the vehicle-mounted ECUs 3 includes identification information for identifying each vehicle-mounted ECU 3. The IP address is an address that can be appropriately determined according to the settings of the in-vehicle communication units 23, and thus it is preferable that a serial number or MAC address is used as identification information for identifying the vehicle-mounted ECUs 3. Also, the identification information may include an ECU-part number (model number) of the vehicle-mounted ECU 3 in addition to the serial number or the MAC address.

The identification information of the vehicle-mounted ECU 3 includes the serial number or the MAC address included in the configuration information of the vehicle-mounted ECU 3. The control unit 20 of the vehicle-mounted update apparatus 2 stores, in the storage unit 21, the identification information of the vehicle-mounted ECU 3 indicated by the serial number or the MAC address included in the configuration information in association with information regarding the state of progress of transmission of an update program to the vehicle-mounted ECU 3, the information including the date and time of the previously completed update and the reprogramming status.

The information included in the configuration information of the vehicle-mounted ECUs 3 is not limited to the information of the items shown in FIG. 3. In the case where a vehicle-mounted ECU 3 is connected by a CAN, the configuration information of the vehicle-mounted ECU 3 may include a CAN-ID used (added) when the vehicle-mounted ECU 3 transmits a message.

Figure 4:
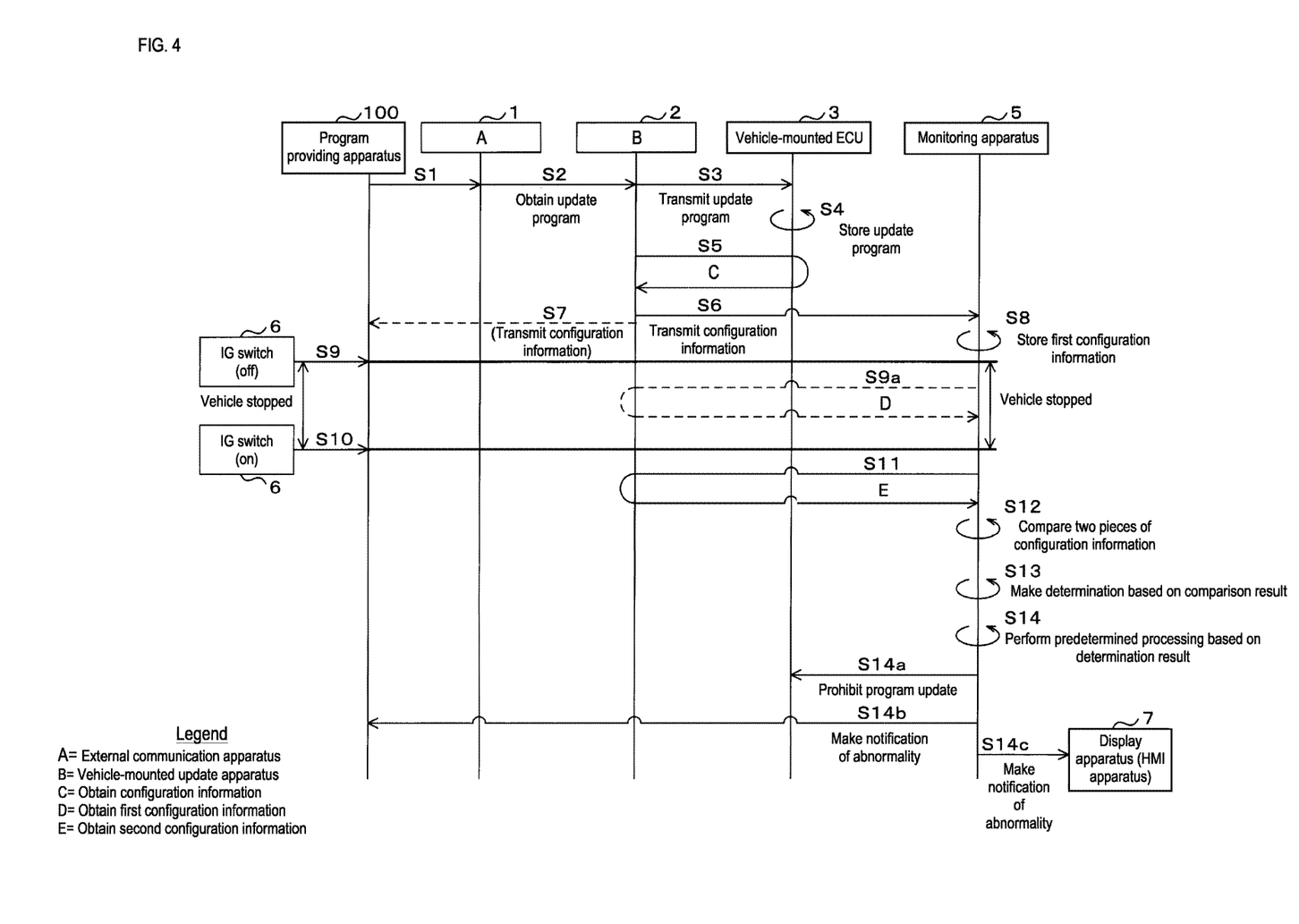
FIG. 4 is a descriptive diagram illustrating an example of a mode of monitoring by the monitoring apparatus.

FIG. 4 is a descriptive diagram illustrating an example of a mode of monitoring by the monitoring apparatus 5. In FIG. 4, monitoring of the vehicle-mounted update apparatus 2 by the monitoring apparatus 5 is described using a sequence diagram including processing performed by the vehicle-mounted update apparatus 2, the monitoring apparatus 5, and the like.

The vehicle-mounted update apparatus 2 obtains an update program from the program providing apparatus 100 via the external communication apparatus 1 (steps S1 and S2). The vehicle-mounted update apparatus 2 refers to header information and the like of the obtained update program to specify the vehicle-mounted ECU 3 that is to apply the obtained update program, and transmits the update program to the specified vehicle-mounted ECU 3 (step S3).

The vehicle-mounted ECU 3 that has received the update program transmitted from the vehicle-mounted update apparatus 2 stores the received update program in the storage unit 31 of the same ECU, and updates the program of the same ECU by switching to the received update program at a predetermined timing, that is, reprogramming processing is completed (step S4).

The vehicle-mounted update apparatus 2 obtains the configuration information transmitted from the vehicle-mounted ECU 3 that has completed the program update (step S5), and stores the obtained configuration information in the storage unit 21 of the same apparatus. Also, the vehicle-mounted update apparatus 2 may regularly transmit a signal to all of the vehicle-mounted ECUs 3 installed in the vehicle C requesting the transmission of configuration information from each ECU, consolidate the configuration information transmitted from each of the vehicle-mounted ECUs 3 in response to the request, and store the consolidated configuration information. The vehicle-mounted update apparatus 2 transmits the configuration information to the monitoring apparatus 5 (step S6). The vehicle-mounted update apparatus 2 may transmit the configuration information to the program providing apparatus 100 via the external communication apparatus 1 (step S7).

The monitoring apparatus 5 obtains the configuration information transmitted from the vehicle-mounted update apparatus 2 and stores the obtained configuration information in the storage unit 51 of the same apparatus as first configuration information (step S8). Transmitting and receiving of configuration information between the vehicle-mounted update apparatus 2 and the monitoring apparatus 5 means that the latest configuration information is shared by the vehicle-mounted update apparatus 2 and the monitoring apparatus 5.

As a result of the IG switch 6 being turned off (step S9), the vehicle C enters a stopped state, and the vehicle-mounted devices including the vehicle-mounted update apparatus 2, the vehicle-mounted ECUs 3, and the monitoring apparatus 5 also enter a stopped state or a standby state. When the IG switch 6 is turned off, the vehicle-mounted update apparatus 2 does not change the stored configuration information. That is, in the period of time from when the monitoring unit 5 receives the first configuration information to when it obtains the later-described second configuration information, the vehicle-mounted update apparatus 2 does not change the stored configuration information or does not obtain configuration information from the vehicle-mounted ECUs 3. When the IG switch 6 is turned off, an IG OFF signal is transmitted to the vehicle-mounted update apparatus 2 from the IG switch 6. The vehicle-mounted update apparatus 2 transmits, based on the received IG OFF signal, information indicating that the IG switch 6 has been turned off to the vehicle-mounted ECUs 3 and the monitoring apparatus 5. The vehicle-mounted ECUs 3 and the monitoring apparatus 5 can recognize whether the IG switch 6 has been turned on or off, based on the signal transmitted from the vehicle-mounted update apparatus 2.

When the IG switch 6 is turned off, the monitoring apparatus 5 may transmit a signal to the vehicle-mounted update apparatus 2 requesting the transmission of stored configuration information, obtain the configuration information transmitted from the vehicle-mounted update apparatus 2 in response to the request (step S9a), and store the obtained configuration information as the first configuration information. As described above, the monitoring apparatus 5 is configured to obtain the configuration information stored in the vehicle-mounted update apparatus 2 through the processing performed in step S6 and step S8, and store the obtained information as the first configuration information in the storage unit 51 of the same apparatus. However, even if communication between the vehicle-mounted update apparatus 2 and the monitoring apparatus 5 fails in step S6 for example, the latest configuration information at the point in time when the IG switch 6 was turned off can be shared by the vehicle-mounted update apparatus 2 and the monitoring apparatus 5 as a result of the monitoring apparatus 5 obtaining the configuration information from the vehicle-mounted update apparatus 2 when the IG switch 6 was turned off.

In response to the IG switch 6 being turned on (step S10), the vehicle C enters a running state, and the vehicle-mounted apparatuses including the vehicle-mounted update apparatus 2, the vehicle-mounted ECUs 3, and the monitoring apparatus 5 also enter a running state.

The monitoring apparatus 5 obtains configuration information from the vehicle-mounted update apparatus 2 (step S11) and stores the configuration information as second configuration information. When the IG switch 6 is turned on, the monitoring apparatus 5 transmits a signal requesting the transmission of stored configuration information to the vehicle-mounted update apparatus 2, obtains the configuration information transmitted by the vehicle-mounted update apparatus 2 in response to the request, and stores the obtained information as the second configuration information. Also, a configuration may be employed where, when the IG switch 6 is turned on, the vehicle-mounted update apparatus 2 voluntarily transmits configuration information to the monitoring apparatus 5, and the monitoring apparatus 5 receives and obtains the transmitted configuration information.

The monitoring apparatus 5 compares the two pieces of obtained configuration information, namely, the first configuration information and the second configuration information (step S12). The comparison between these pieces of configuration information is not limited to a case where all items of both pieces of configuration information are compared, and only specific items may be compared. The specific items are, for example, the manufacturing number and the ECU-part number of each vehicle-mounted ECU 3. Also, the specific items may include the VIN held in any one of the vehicle-mounted ECUs 3. That is, the comparison between these pieces of configuration information may be performed using items necessary to determine substantial identity between the first configuration information and the second configuration information.

The monitoring apparatus 5 determines, based on the comparison result of the first configuration information and the second configuration information, whether or not the vehicle-mounted update apparatus 2 was replaced in the period of time from when the IG switch 6 was turned off to when it was turned on, that is, while the vehicle C was in a stopped state (step S13).

The monitoring apparatus 5 performs predetermined processing based on the determination result (step S14). The predetermined processing is, for example, for transmitting a signal that prohibits a program from being updated by an update program to the vehicle-mounted ECU 3 (step S14a), and transmitting a signal indicating that the vehicle-mounted update apparatus 2 is in an abnormal state (abnormal notification) to the program providing apparatus 100 and the display apparatus 7 (steps S14b and S14c). The details of the predetermined processing performed by the control unit 50 of the monitoring apparatus 5 are described below using a flowchart.

Figure 5:
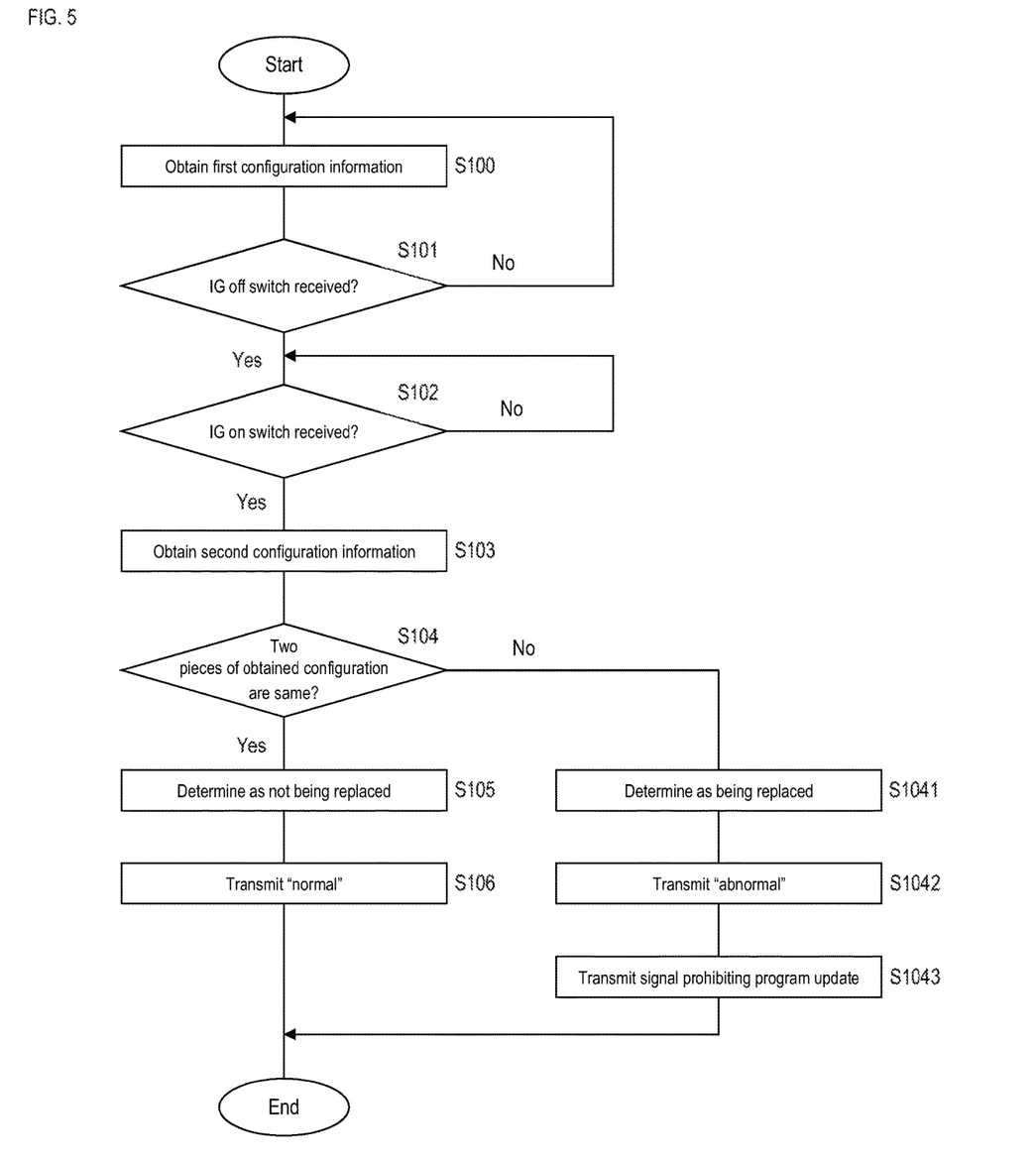
FIG. 5 is a flowchart illustrating an example of processing performed by a control unit of the monitoring apparatus.

FIG. 5 is a flowchart illustrating an example of processing performed by the control unit 50 of the monitoring apparatus 5. The control unit 50 of the monitoring apparatus 5 routinely performs the following processing when the vehicle C is in a running state (the IG switch 6 is on) or in a stopped state (IG switch 6 is on).

The control unit 50 of the monitoring apparatus 5 obtains the first configuration information (step S100). The control unit 50 obtains the configuration information transmitted from the vehicle-mounted update apparatus 2 and stores the configuration information in the storage unit 51 of the same apparatus. Once the vehicle-mounted update apparatus 2 transmits an update program to the vehicle-mounted ECUs 3 and the vehicle-mounted ECUs 3 have completed receiving the update program, the configuration information of the vehicle-mounted ECUs 3 is transmitted to the monitoring apparatus 5 and the program providing apparatus 100, and the control unit 50 of the monitoring apparatus 5 obtains the configuration information by receiving the transmitted configuration information via the in-vehicle communication 53. Also, the control unit 50 of the monitoring apparatus 5 may regularly communicate with the vehicle-mounted ECUs 3 to receive the configuration information from each of the vehicle-mounted ECUs 3, and store the configuration information in the storage unit 51 of the same apparatus. That is, the monitoring apparatus 5 and the vehicle-mounted update apparatus 2 each routinely independently communicate with the vehicle-mounted ECUs 3, and receive the configuration information transmitted from each of the vehicle-mounted ECUs 3. Then, the monitoring apparatus 5 and the vehicle-mounted update apparatus 2 may consolidate and store the configuration information from each of the vehicle-mounted ECUs 3 in their storage units 51 and 21, respectively, and synchronize with each other so that the configuration information (vehicle configuration information) stored in the storage units 51 and 21 of both apparatuses is the same.

The control unit 50 of the monitoring apparatus 5 determines whether or not the IG OFF signal has been received (step S101). The control unit 50 determines whether or not the IG switch 6 has been turned off (IG OFF signal), based on a signal transmitted from the IG switch 6 via the vehicle-mounted update apparatus 2.

If the IG OFF signal has not been received (step S101: NO), the vehicle C is in a running state, and the control unit 50 of the monitoring apparatus 5 performs loop processing so as to perform the processing in step S100 again. That is, as a result of the control unit 50 of the monitoring apparatus 5 repeating the processing in step S100 to obtain the first configuration information, the latest configuration information of the vehicle-mounted ECUs 3 can constantly be obtained and stored.

If the IG OFF signal has been received (step S101: YES), the vehicle C is in a stopped state (power has been turned off), and the control unit 50 of the monitoring apparatus 5 determines whether or not the IG ON signal has been received (step S102). The control unit 50 determines whether or not a signal indicating that the IG switch 6 has been turned on (IG ON signal) has been received based on a signal transmitted from the IG switch 6 via the vehicle-mounted update apparatus 2.

If the IG ON signal has not been received (step S102: NO), the control unit 50 of the monitoring apparatus 5 performs loop processing so as to execute the processing of step S102 again. That is, the control unit 50 performs stand-by processing until the IG ON signal is received (until the IG switch 6 is turned on).

If the IG ON signal has been received (step S102: YES), the control unit 50 of the monitoring apparatus 5 obtains the second configuration information (step S103). The control unit 50, for example, transmits a signal to the vehicle-mounted update apparatus 2 requesting the transmission of stored configuration information, and obtains the configuration information (second configuration information) transmitted by the vehicle-mounted update apparatus 2 in response to the request. Also, if the IG switch 6 has been turned on, the vehicle-mounted update apparatus 2 may voluntarily transmit configuration information (second configuration information) stored therein to the monitoring apparatus 5, and the control unit 50 of the monitoring apparatus 5 may obtain the configuration information voluntarily transmitted from the vehicle-mounted update apparatus 2. That is, the control unit 50 of the monitoring apparatus 5 obtains the configuration information stored in the vehicle-mounted update apparatus 2 through pull or push communication, and stores the obtained configuration information as the second configuration information.

The control unit 50 of the monitoring apparatus 5 determines whether or not the two pieces of obtained configuration information are the same (step S104). The control unit 50 compares the first configuration information obtained through the processing in step S100 and the second configuration information obtained through the processing in step S103, and determines whether these two pieces of configuration information are the same.

In the period of time from when the monitoring apparatus 5 obtains the first configuration information until when it obtains the second configuration, the vehicle-mounted update apparatus 2 does not change the stored configuration information. Accordingly, if there is a difference between the first configuration information and the second configuration information, the vehicle-mounted update apparatus 2 can be determined as having been replaced. Replacement of the vehicle-mounted update apparatus 2 is not limited to the case where the actual vehicle-mounted update apparatus 2 itself is replaced, but includes cases where only the storage unit 21 of the vehicle-mounted update apparatus 2 is replaced, and where configuration information and data of a program or the like stored in the storage unit 21 have been rewritten.

If the first configuration information and the second configuration information are the same (step S104: YES), the control unit 50 of the monitoring apparatus 5 determines that the vehicle-mounted update apparatus 2 has not been replaced (step S105). The first configuration information and the second configuration information being the same means that the content of items to be compared such as the manufacturing number or the ECU-part number of each vehicle mounted ECU 3, or the VIN held by any one vehicle-mounted ECU 3, which are items included in the configuration information, is the same, and indicates that the first configuration information and the second configuration information are substantially the same configuration information. In this way, if the first configuration information and the second configuration information are the same, the control unit 50 of the monitoring apparatus 5 determines that the vehicle-mounted update apparatus 2 at the point in time at which the first configuration information was obtained and the vehicle-mounted update apparatus 2 at the point in time at which the second configuration information was obtained are the same vehicle-mounted update apparatus 2 and that the vehicle-mounted update apparatus 2 has not been replaced.

The control unit 50 of the monitoring apparatus 5 transmits an indication that the vehicle-mounted update apparatus 2 is normal (step S106). The control unit 50 transmits, via the external communication apparatus 1, an indication that the vehicle-mounted update apparatus 2 is normal and the determination result to the program providing apparatus 100 or the display apparatus 7, or to both the program providing apparatus 100 and the display apparatus 7.

If the first configuration information and the second configuration information are not the same (step S104: NO), the control unit 50 of the monitoring apparatus 5 determines that the vehicle-mounted update apparatus 2 has been replaced (step S1041). The first configuration information and the second configuration information not being the same means that the content of items to be compared such as the manufacturing number or the ECU-part number of each vehicle mounted ECU 3, or the VIN held by any one vehicle-mounted ECU 3, that is items included in the configuration information, is different. If the content of the items is different, the control unit 50 of the monitoring apparatus 5 determines that the vehicle-mounted update apparatus 2 at the point in time when the first configuration information was obtained and the vehicle-mounted update apparatus 2 at the point in when the second configuration information was obtained are different vehicle-mounted update apparatuses 2, and that the vehicle-mounted update apparatus 2 was replaced in the period of time from the point in when the first configuration information was obtained to the point in time when the second configuration information was obtained.

The first configuration information and the second configuration information may be determined as not being the same (as being different) also in the case where the control unit 50 of the monitoring apparatus 5 cannot communicate with, for example, the vehicle-mounted update apparatus 2 and cannot obtain the second configuration information. A case is also envisioned in which the vehicle-mounted update apparatus 2 replaced without authorization does not respond to a signal transmitted from the monitoring apparatus 5 (a signal requesting transmission of configuration information), and by determining that the first configuration information and the second configuration information are different also in the case where the second configuration information cannot be obtained, appropriate actions can be taken for a vehicle-mounted update apparatus 2 replaced without authorization.

The control unit 50 of the monitoring apparatus 5 transmits an indication that the vehicle-mounted update apparatus 2 is abnormal (step S1042). The control unit 50 transmits, via the external communication apparatus 1, an indication that the vehicle-mounted update apparatus 2 is abnormal and the determination result to the program providing apparatus 100 or the display apparatus 7, or to both the program providing apparatus 100 and the display apparatus 7. The indication that the vehicle-mounted update apparatus 2 is abnormal is information including the fact that the vehicle-mounted update apparatus 2 has been replaced without authorization during the period from the point in time when the first configuration information was obtained to the point in time when the second configuration information was obtained, and includes time information indicating the point in time when the first configuration information was obtained and the point in time when the second configuration information was obtained. Also, the control unit 50 may include the first configuration information and the second configuration information when transmitting the indication that the vehicle-mounted update apparatus 2 is abnormal.

In this way, by including the time information and the first configuration information and the second configuration information when transmitting information regarding the fact that the vehicle-mounted update apparatus 2 has been replaced, the administrator of the program providing apparatus 100 or the operator of the vehicle C can be made aware of the fact that the vehicle-mounted update apparatus 2 is abnormal and urged to take appropriate actions.

The control unit 50 of the monitoring apparatus 5 transmits a signal that prohibits program updates (step S1043). The control unit 50 transmits, to the vehicle-mounted ECUs 3, a signal that prohibits a program from being updated by an update program transmitted from the vehicle-mounted update apparatus 2. Upon envisioning that the vehicle-mounted update apparatus 2 is in an abnormal state of having been replaced without authorization, it can be envisioned that an update program transmitted from such an abnormal vehicle-mounted update apparatus 2 is an unauthorized program, that is, a malicious program with the intention of attacking the vehicle C. Thus, the control unit 50 of the monitoring apparatus 5 transmits, to the vehicle-mounted ECUs 3 installed in the vehicle C, a signal that prohibits a program stored in the corresponding ECU from being updated by an update program transmitted from the vehicle-mounted update apparatus 2 after transmission of the prohibiting signal.

The vehicle-mounted ECUs 3 that have received the prohibiting signal from the monitoring apparatus 5 change flag information stored in the storage unit 31 of the same ECU, and transition to a mode in which reception of an update program transmitted from the vehicle-mounted update apparatus 2 is denied, for example. By prohibiting a program of the vehicle-mounted ECUs 3 from being updated by an update program transmitted from the vehicle-mounted update apparatus 2 in this manner, the vehicle-mounted ECUs 3 can be protected from attacks from the abnormal vehicle-mounted update apparatus 2 replaced without authorization.

The control unit 50 of the monitoring apparatus 5 executes the processing in step S106 or step S1043, and ends this series of processing. Once the processing in step S106 has been executed, the control unit 50 of the monitoring unit 5 may perform loop processing so as to execute the processing in step S100 again.

In the present embodiment, the control unit 50 of the monitoring apparatus 5 was described as obtaining the first configuration information when the vehicle C is in the running state (IG switch 6 is ON), but the present invention is not limited to this. The control unit 50 of the monitoring apparatus 5 may determine whether or not the IG OFF signal has been received (IG switch 6 is off), and obtain the first configuration information if the IG OFF signal has been received. Also, in the case where the IG switch 6 is turned off in the period of time from start to end of obtaining of the configuration information, the control unit 50 of the monitoring unit 5 may, for example, keep the power of the vehicle C on by using a power maintaining circuit, and turn off the power of the vehicle C once the control unit 50 of the monitoring apparatus 5 has completed obtaining the first configuration information and saving the first configuration information to the storage unit 51.

In the present embodiment, the control unit 50 of the monitoring apparatus 5 was described as obtaining the second configuration information as per the processing in step S103 when the IG ON signal has been received, but the present invention is not limited to this. The control unit 50 of the monitoring apparatus 5 may use a clock function provided in the control unit 50 to exhibit a scheduling function for obtaining the second configuration information at a predetermined timing. That is, the control unit 50 of the monitoring apparatus 5 may obtain the second configuration information and execute (start) the processing after step S103 at a predetermined time every day, which is an example of a schedule setting realized by the scheduling function.

If the first configuration information and the second configuration information are different, the control unit 50 of the monitoring apparatus 5 determines that the vehicle-mounted update apparatus 2 has been replaced and executes predetermined processing, and thus appropriate actions can be taken when the vehicle-mounted update apparatus 2 has been replaced in the period of time from the point in time when the first configuration information was obtained to the point in time when the second configuration information was obtained. Regarding the information that is to be compared, due to the vehicle-mounted update apparatus 2 using the routinely obtained configuration information from the vehicle-mounted ECUs 3 in performing update processing such as transmitting an update program, the need to retain dedicated information that is to be compared is omitted, and effective comparison can be realized.

In setting the configuration information to be compared, the monitoring apparatus 5 stores the first configuration information in the storage apparatus 51, the first configuration information corresponding to a backup of configuration information stored when the vehicle-mounted update apparatus 2 is in a normal state. As described above, the configuration information (vehicle configuration information) stored in the vehicle-mounted update apparatus 2 is consolidated information of the configuration information regarding the ECUs respectively stored in the vehicle-mounted ECUs 3. Accordingly, by storing the configuration information stored in the vehicle-mounted update apparatus 2 prior to being replaced as the first configuration information in the monitoring apparatus, even if the vehicle-mounted update apparatus 2 has been replaced without authorization, the stored configuration information of the pre-replacement vehicle-mounted update apparatus 2 is prevented from being lost.

The control unit 50 of the monitoring apparatus 5 obtains the first configuration information while the vehicle C is running (the IG switch 6 is ON) or when the IG switch 6 has been turned off, and obtains the second configuration information when the turned off IG switch 6 is turned on again and the vehicle C is running. Accordingly, if the vehicle-mounted update apparatus 2 is replaced during the period of time from when the IG switch 6 is turned off until it is turned on, that is, while the vehicle C is stopped, an appropriate determination with regards to whether or not the vehicle-mounted update apparatus 2 has been replaced can be made.

Second Embodiment

Figure 6:
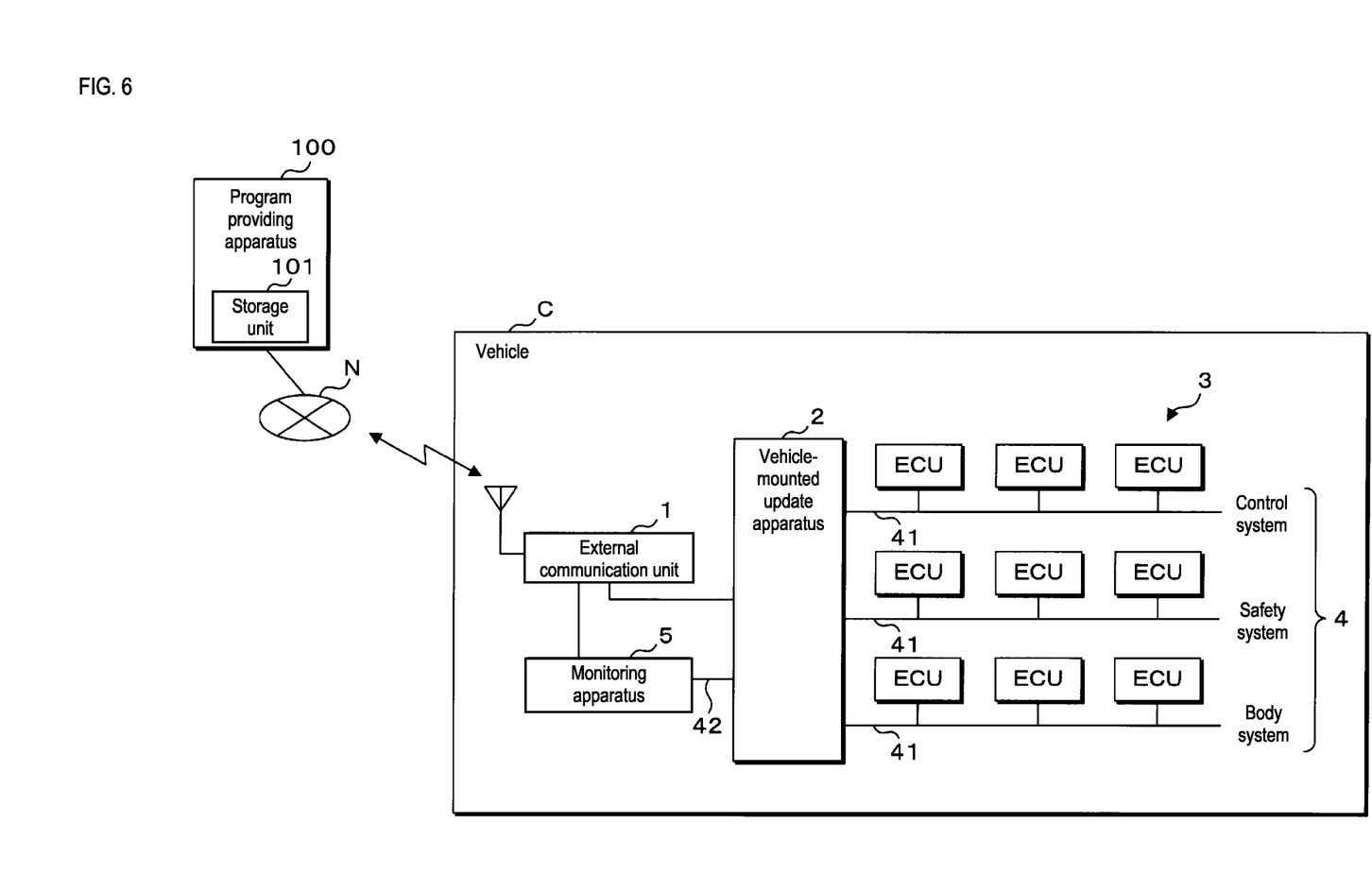
FIG. 6 is a schematic diagram illustrating an example of a configuration of a vehicle-mounted update system including a monitoring apparatus according to Embodiment 2.
Figure 7:
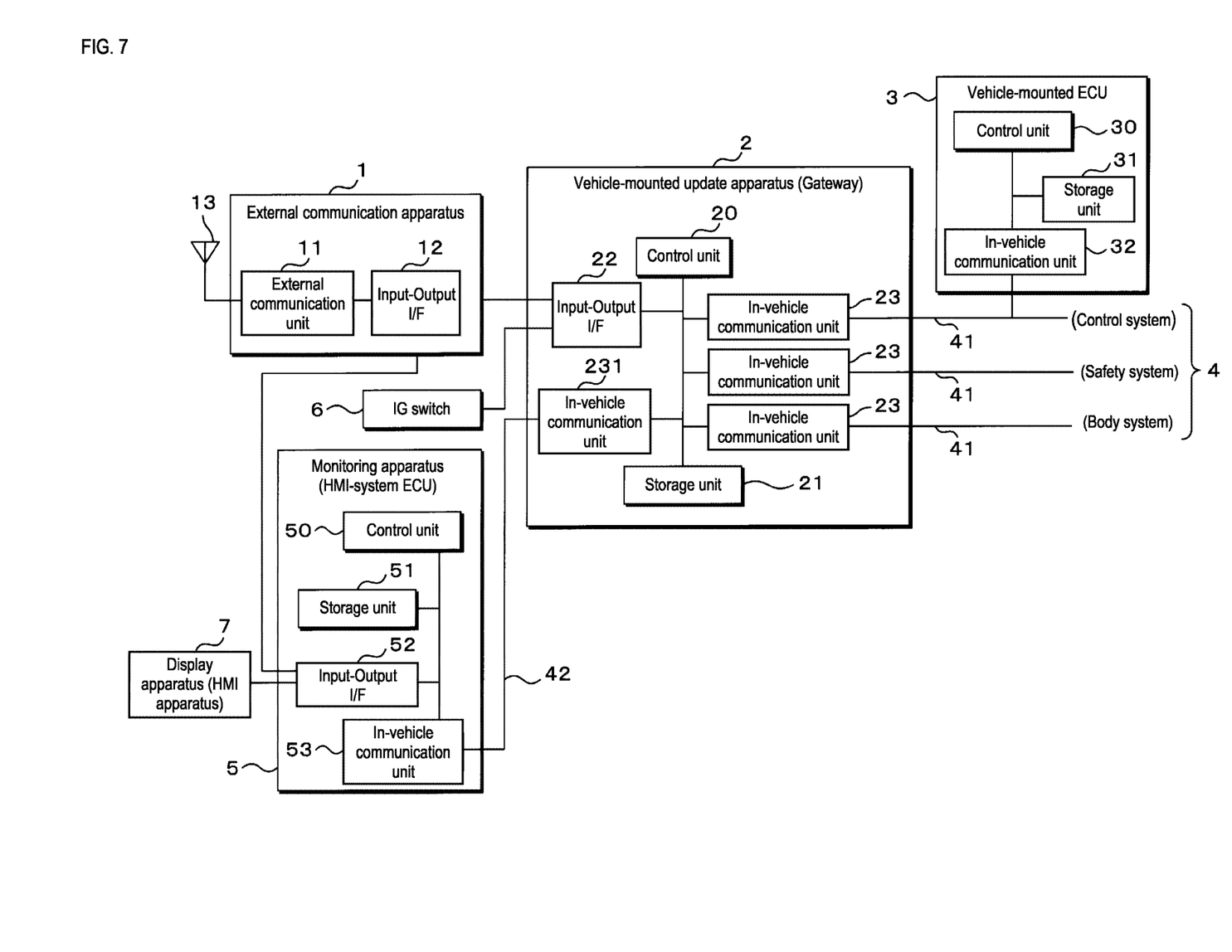

FIG. 6 is a schematic diagram illustrating an example of a configuration of a vehicle-mounted update system including the monitoring apparatus 5 according to Embodiment 2. FIG. 7 is a block diagram illustrating an example of a configuration of the monitoring apparatus 5 and the like. The monitoring apparatus 5 of Embodiment 2 differs from the monitoring apparatus 5 of Embodiment 1 in that it is directly connected to the external communication apparatus 1 without being connected thereto via the vehicle-mounted update apparatus 2.

The monitoring apparatus 5 of Embodiment 2 is directly connected to the external communication apparatus 1 via an input-output I/F. That is, the input-output I/F of the monitoring apparatus 5 and the input-output I/F of the external communication apparatus 1 are communicably connected by a harness such as a serial cable. Note that the mode of connection between the monitoring apparatus 5 and the external communication apparatus 1 is not limited to a harness such as a serial cable connecting both of the input-out I/Fs thereof to each other, and may be, for example, a mode of connection in which in-vehicle communication units configured by CAN or Ethernet are connected to each other by a CAN bus or an Ethernet cable.

Similarly to Embodiment 1, the control unit 50 of the monitoring apparatus 5 determines that the vehicle-mounted update apparatus 2 has been replaced if the obtained first configuration information and the second configuration information are different. The control unit 50 communicates directly with the external communication apparatus 1 without doing so via the vehicle-mounted update apparatus 2, and transmits an indication that the vehicle-mounted update apparatus 2 is abnormal and the determination result to the program providing apparatus 100 via the external communication apparatus 1.

There is a high probability that the vehicle-mounted update apparatus 2 determined as having been replaced is an unauthorized apparatus. Thus, the monitoring apparatus 5 is directly connected to the external communication apparatus 1 without being connected thereto via the vehicle-mounted update apparatus 2 suspected as being an unauthorized apparatus, and can communicate with an external server via the external communication apparatus 1. Accordingly, an indication that the vehicle-mounted update apparatus 2 has been replaced can be reliably transmitted to the external server.

The embodiments disclosed herein are examples in all respects, and are not to be construed as limiting. The scope of the present invention is defined by the claims rather than by the meaning of the description above, and all modifications equivalent to and within the scope of the claims are intended to be encompassed.

The invention claimed is:

1. A monitoring apparatus installed in a vehicle and communicably connected to a gateway, the gateway storing a configuration information of a vehicle-mounted ECU and transmitting an update program, the configuration information including a MAC address and an IP address, the monitoring apparatus monitors the gateway, the monitoring apparatus comprising:
an Ethernet cable, the gateway and the monitoring apparatus are directly connected by the Ethernet cable;
control unit configured to obtain a plurality of pieces of the configuration information of vehicle-mounted ECUs from the gateway; and
a storage unit configured to store the obtained configuration information as a backup of configuration information stored when the gateway is in a normal state,
wherein, if previously obtained first configuration information and most recently obtained second configuration information are different, the control unit determines that the gateway has been replaced and executes a predetermined processing, and
the control unit obtains the first configuration information and the second configuration information in a period of time not including a point in time when the configuration information of the vehicle-mounted ECUs obtained by the gateway is stored, wherein when the first configuration information and the second configuration information are the same, the control unit determines the gateway was not replaced and when the first configuration information and the second configuration information are different, the control unit determines the gateway was replaced, wherein when the control unit determines that the gateway has been replaced the control unit transmits a signal to the gateway to prohibit program updating.

2. The monitoring apparatus according to claim 1, wherein, if an ignition switch of the vehicle is turned on, the control unit obtains the second configuration information, and determines that the gateway has been replaced and executes predetermined processing if the first configuration information obtained prior to the turning-on and the second configuration information are different.

3. The monitoring apparatus according to claim 1, wherein the predetermined processing executed by the control unit is processing for transmitting information regarding the determination to an external server that provides the update program or a display device provided in the vehicle.

4. The monitoring apparatus according to claim 3, wherein an external communication apparatus for communicating with the external server that provides the update program, the gateway, and the monitoring apparatus are directly connected, and the predetermined processing executed by the control unit is processing for transmitting the information regarding the determination to the external server that provides the update program via the external communication apparatus, not via the gateway.

5. The monitoring apparatus according to claim 1, wherein the predetermined processing executed by the control unit is processing for transmitting a signal that prohibits a program stored in the vehicle-mounted ECU from being updated by the update program, to the vehicle-mounted ECU.

6. A monitoring method comprising:
   providing a monitoring apparatus and a gateway, the monitoring apparatus and the gateway connected to each other by an Ethernet cable;
   providing, from the gateway that stores configuration information of a vehicle-mounted ECU that is to apply an update program, a plurality of pieces of the configuration information of vehicle-mounted ECUs to the monitoring apparatus via the Ethernet cable, the configuration information including a MAC address and an IP address;
   storing the obtained configuration information as a backup of configuration information stored when the gateway is in a normal state;
   determining that the gateway has been replaced and executing predetermined processing if previously obtained first configuration information and most recently obtained second configuration information are different; and
   wherein the first configuration information and the second configuration information is obtained in a period of time not including a point in time when the configuration information of the vehicle-mounted ECUs obtained by the gateway is stored, wherein when the first configuration information and the second configuration information are the same, the control unit determines the gateway was not replaced and when the first configuration information and the second configuration information are different the control unit determines the gateway was replaced, wherein when the control unit determines that the gateway has been replaced the control unit transmits a signal to the gateway to prohibit program updating.

7. The monitoring apparatus according to claim 2, wherein the predetermined processing executed by the control unit is processing for transmitting information regarding the determination to an external server that provides the update program or a display device provided in the vehicle.

8. The monitoring apparatus according to claim 2, wherein the predetermined processing executed by the control unit is processing for transmitting a signal that prohibits a program stored in the vehicle-mounted ECU from being updated by the update program, to the vehicle-mounted ECU.

9. The monitoring apparatus according to claim 3, wherein the predetermined processing executed by the control unit is processing for transmitting a signal that prohibits a program stored in the vehicle-mounted ECU from being updated by the update program, to the vehicle-mounted ECU.

10. The monitoring apparatus according to claim 4, wherein the predetermined processing executed by the control unit is processing for transmitting a signal that prohibits a program stored in the vehicle-mounted ECU from being updated by the update program, to the vehicle-mounted ECU.

* * * * *